(12) United States Patent
Brassard et al.

(10) Patent No.: US 6,769,095 B1
(45) Date of Patent: Jul. 27, 2004

(54) HIERARCHICALLY STRUCTURED CONTROL INFORMATION EDITOR

(75) Inventors: Michel Brassard, St-Eustache (CA); Boris Shingarov, Ottawa (CA)

(73) Assignee: Codagen Technologies Corp., Montréal (CA)

(*) Notice: Subject to any disclaimer, the term of this patent is extended or adjusted under 35 U.S.C. 154(b) by 615 days.

(21) Appl. No.: 09/721,902

(22) Filed: Nov. 27, 2000

Related U.S. Application Data

(63) Continuation of application No. PCT/CA00/00841, filed on Jul. 24, 2000.
(60) Provisional application No. 60/145,207, filed on Jul. 23, 1999.

(51) Int. Cl.$^7$ .............................................. G06F 17/30
(52) U.S. Cl. ........................ 715/513; 715/514; 717/147
(58) Field of Search ............................... 715/513, 514, 715/506; 717/147, 111; 345/723

(56) References Cited

U.S. PATENT DOCUMENTS

| | | | |
|---|---|---|---|
| 5,603,018 A | | 2/1997 | Terada et al. |
| 5,842,020 A | * | 11/1998 | Faustini ..................... 717/111 |
| 5,875,331 A | | 2/1999 | Lindsey |
| 6,018,628 A | * | 1/2000 | Stoutamire .................. 717/147 |
| 6,118,445 A | * | 9/2000 | Nonomura et al. ......... 345/723 |
| 6,526,423 B2 | * | 2/2003 | Zawadzki et al. .......... 715/506 |

FOREIGN PATENT DOCUMENTS

| | | |
|---|---|---|
| EP | 0 398646 A2 | 9/1990 |
| EP | 0 897 148 A1 | 2/1999 |
| WO | WO 99/48000 A1 | 9/1999 |

* cited by examiner

*Primary Examiner*—Sanjiv Shah
(74) *Attorney, Agent, or Firm*—Ogilvy Renault; Isabelle Chabot

(57) ABSTRACT

The first process provides a context sensitive editor to create, modify and display hierarchically structured control information. The editor provides action choices appropriate to the immediately current context, thereby simplifying the manipulation protocol of the user. Because the editor understands the relationships and multiplicity between the contexts, its editor and display represents the repetition and conditionality of the blocks without resorting to a scripting language. The editor displays the control information according to the display rules of the associated context. The presentation clearly differentiates between the bulk text, the structure in which the text resides, and parameterized elements. The editor effectively manipulates what is meta control information in a way that displays it as information. The second process provides a method to systematically transform the control information into a machine-understandable format, such as code generator script data.

18 Claims, 16 Drawing Sheets

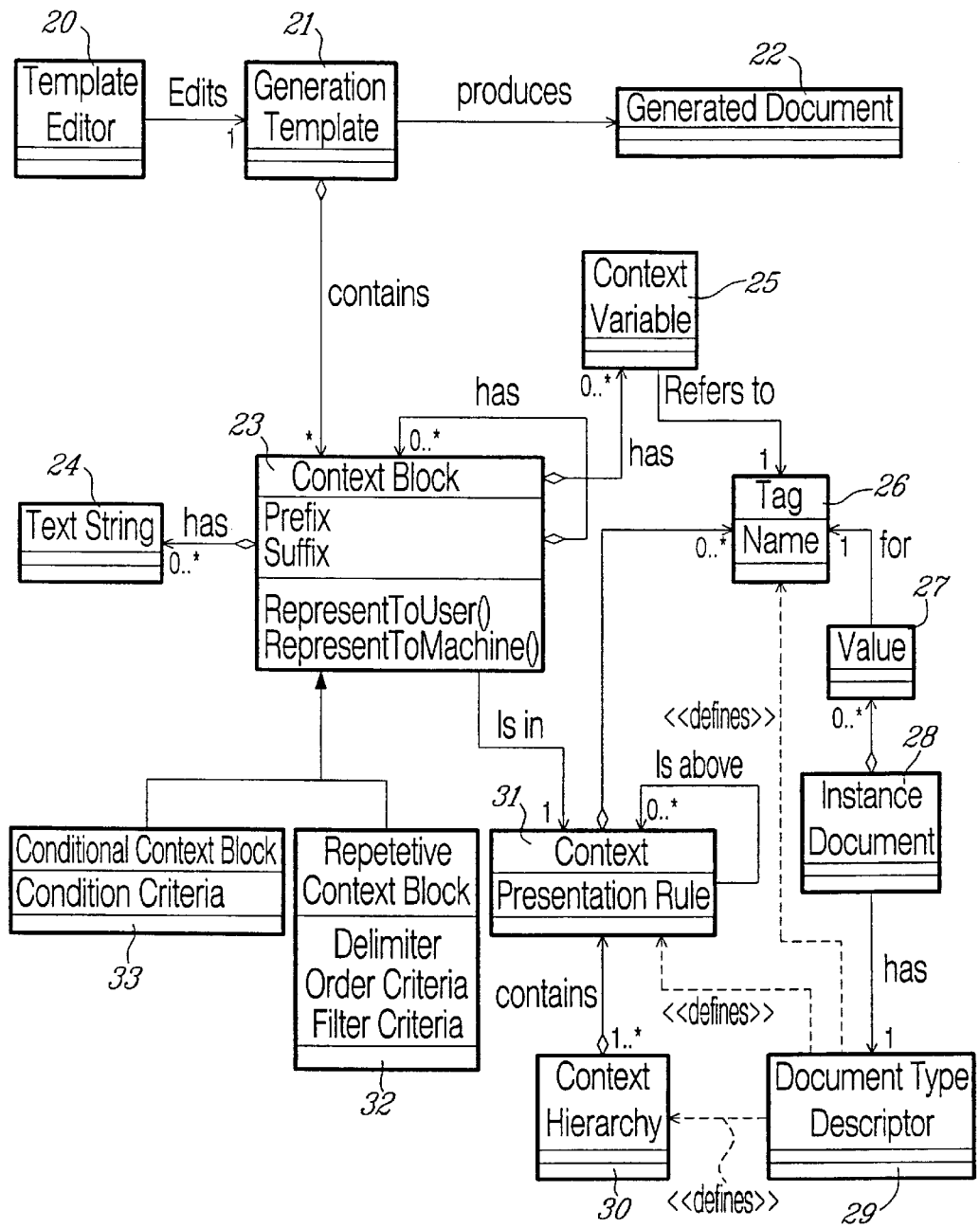

```
/**
 * Take Properties result set received from database, and populate
 * <class name/>'s Data fields.
 * @param resultSet the data used in populating the <class name/>'s Data fields
 */
public void setPropObjectData (java.util.Properties resultSet) {
    if (resultSet.get("<Attribute Name/>")!=null
        && (resultSet.get("<Attribute Name/>") instanceof CBNull))){
        <attribute name/> = (<attribute type/>)resultSet.get("<Attribute Name/>");
    } else {
        <attribute name/>=null;
        <attribute name/>NullIndicator = true;
    }
}
```

FIG-2

```
templateName^ !setPropObjectData! definedAs^ ( &class  )

generate^ (
              operation^  public^  instance^ (!setPropObjectData! )

definedAs^ (                 76
(!/**
 * Take Properties result set received from database, and populate
 * %001's Data fields.
 * @param resultSet The data used in populating the %001's Data fields      75
 */
public   void setPropObjectData (java.util.Properties resultSet) {

77
 ! with^   ( &class name^      )
(!    if(resultSet.get("%001") !!= null
                    && !!(resultSet.get("%001") instanceof CBNull))
           %002 = (%003)resultSet.get("%001");                              78
79    else {
                %002= null;                                 79
                %002NullIndicator = true;
      }!
      repeatForEach^ attributeOrTargetRoleFilterExpression^ ( &attribute
)
      using^   ( &attribute nameAsClassName^ ; &attribute name^ ;
&attribute className^   )
             intermediateDelimiterString^ !
!)                                                      80
(!
}                75

!)
)).                                              FIG. 3
```

```
/**                                82
 * Take Properties result set received from database, and populate
 * cityinfo's Data fields.
 * @param resultSet The data used in populating the cityinfo's Data fields          81
 */
public   void setPropObjectData (java.util.Properties resultSet) {
        if(resultSet.get("Country") != null
                    && !(resultSet.get("Country") instanceof CBNull))
            country = (String)resultSet.get("Country");
 84     else {
            country= null;
            countryNullIndicator = true;
        }
        if(resultSet.get("Population") != null
                    && !(resultSet.get("Population") instanceof CBNull))
            population = (Integer)resultSet.get("Population");
 85     else {
            population= null;
            populationNullIndicator = true;
                                            83
        }
        if(resultSet.get("Name") != null
                    && !(resultSet.get("Name") instanceof CBNull))
            name = (String)resultSet.get("Name");
 86     else {
            name= null;
            nameNullIndicator = true;
        }
}         83                        } 81
```

FIG. 4

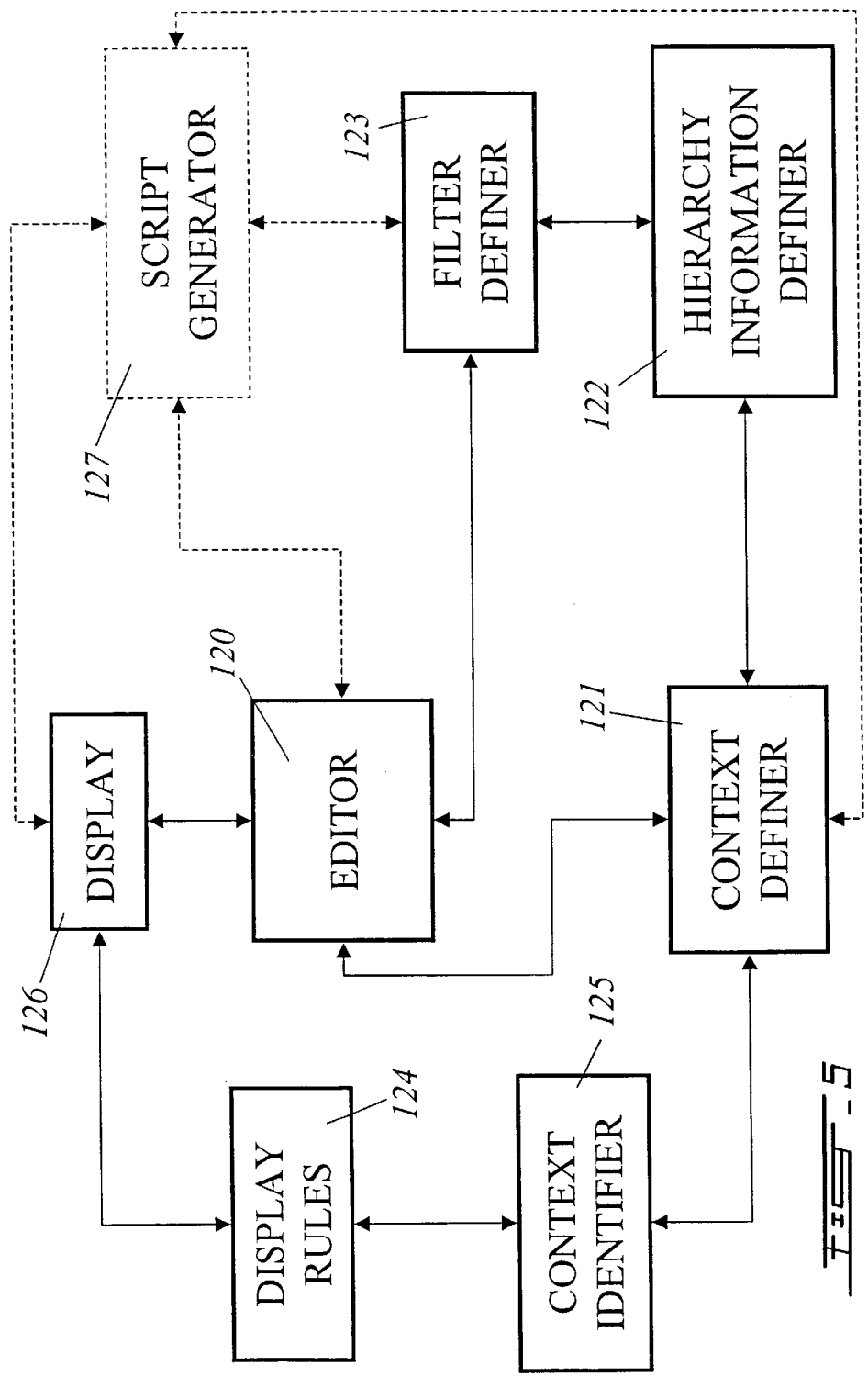

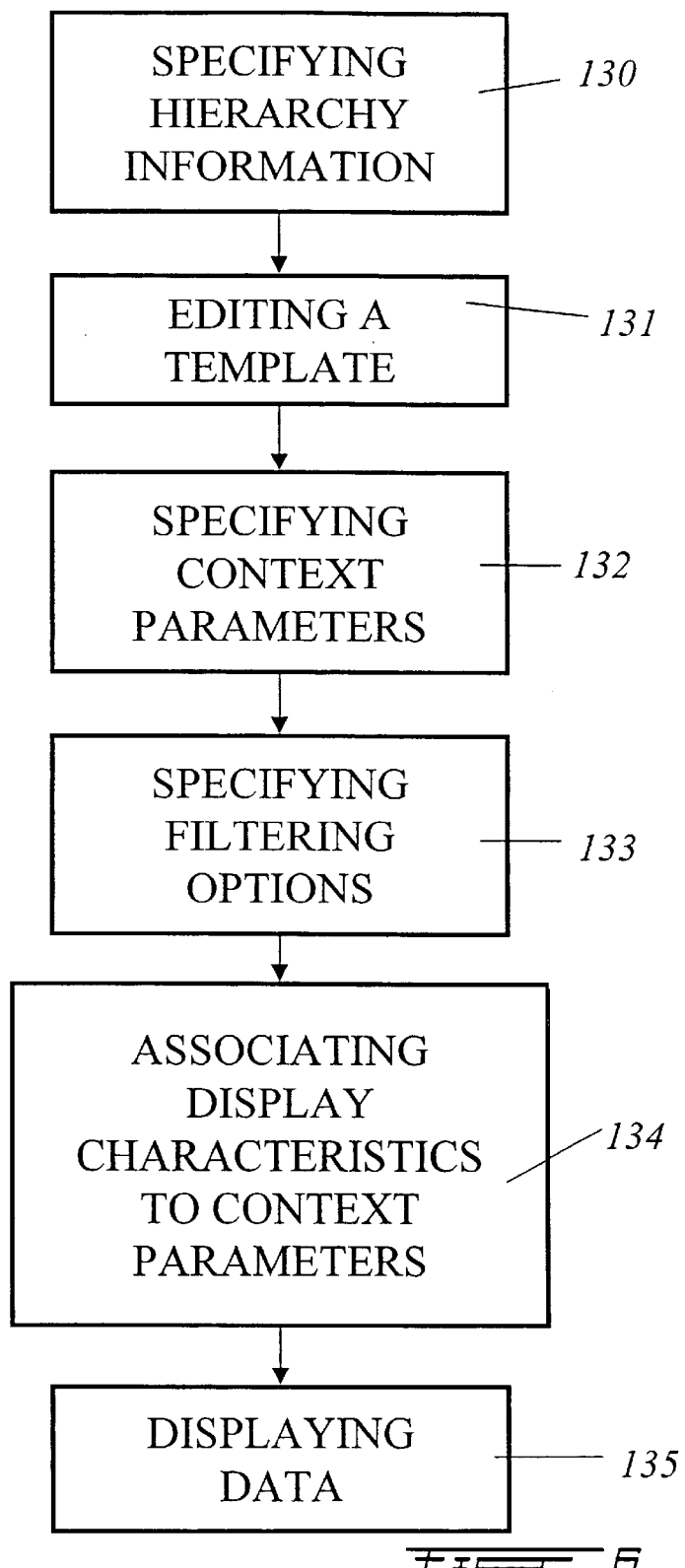

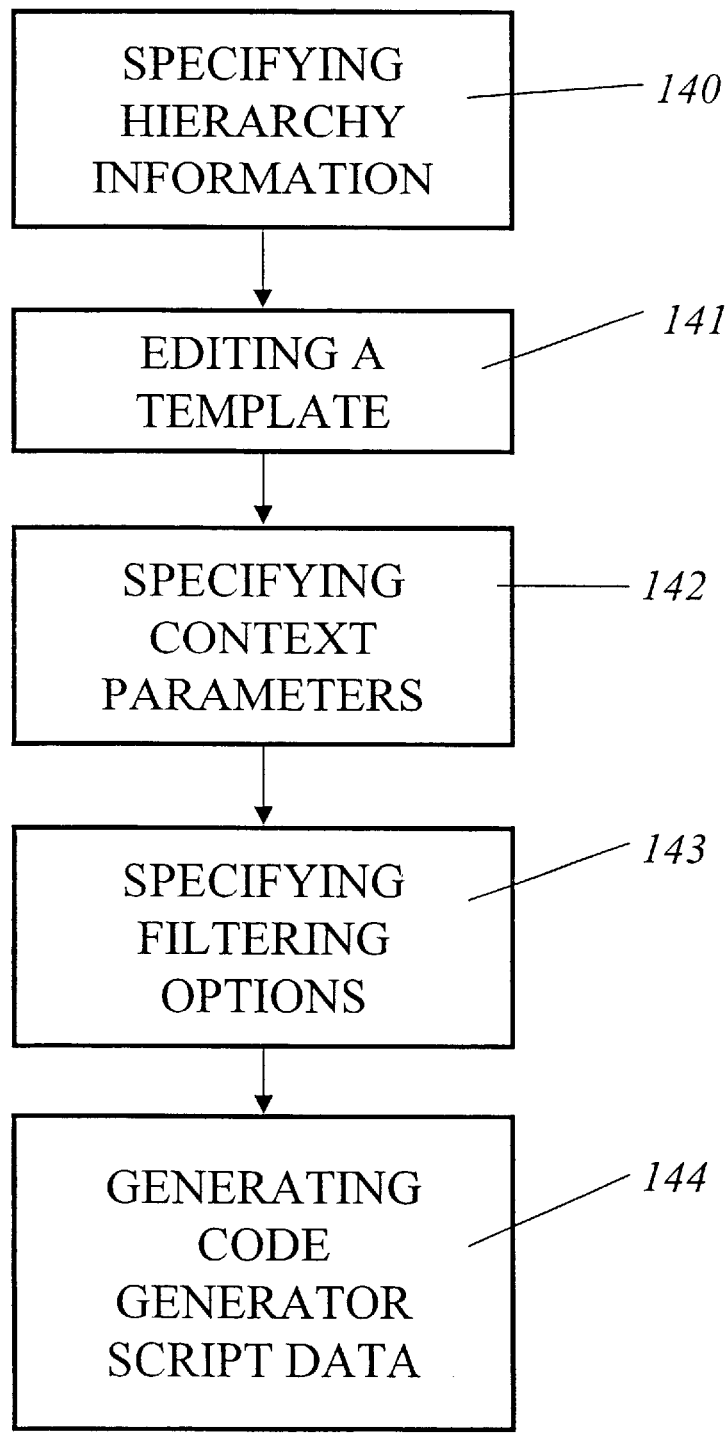
FIG_7

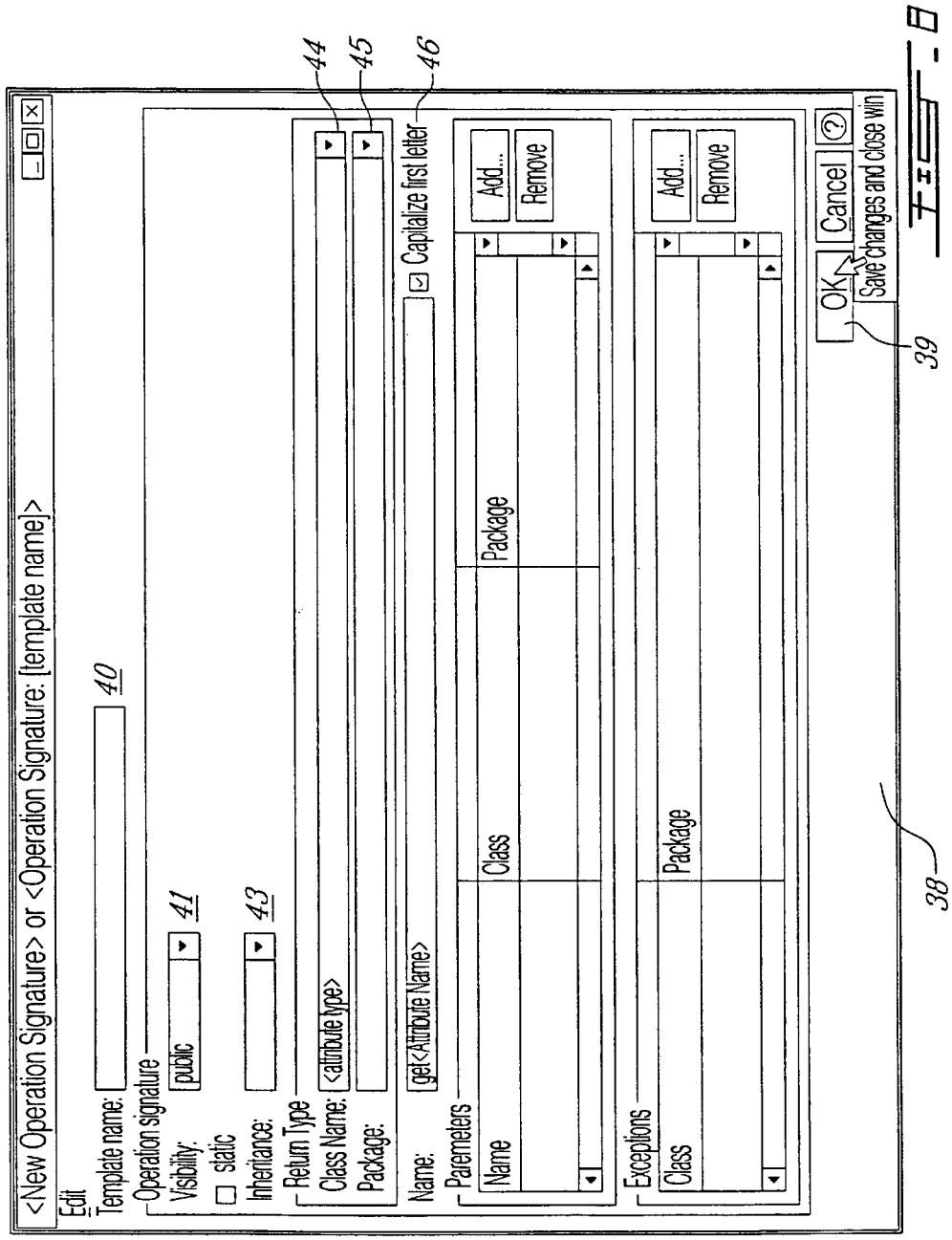

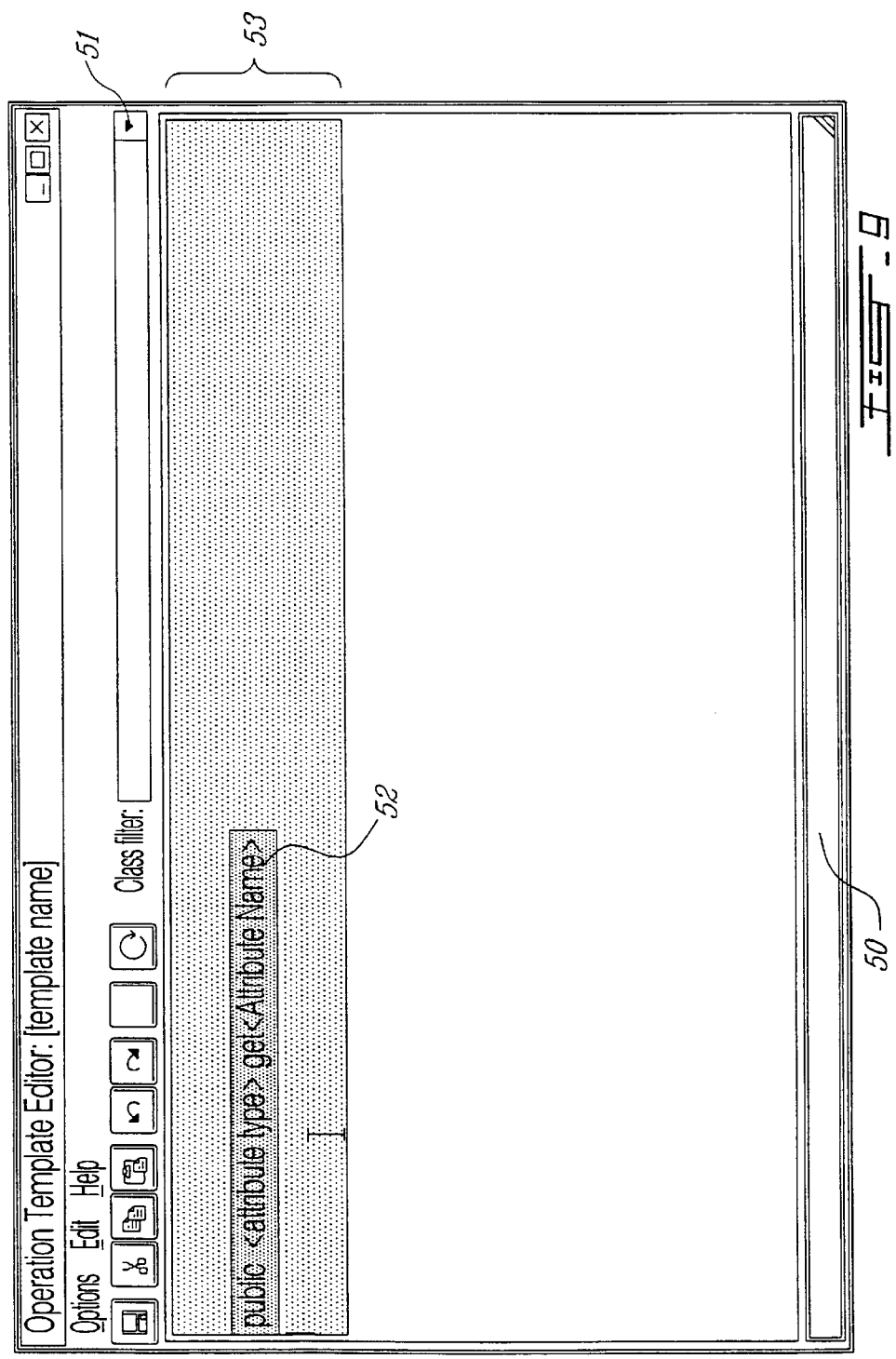

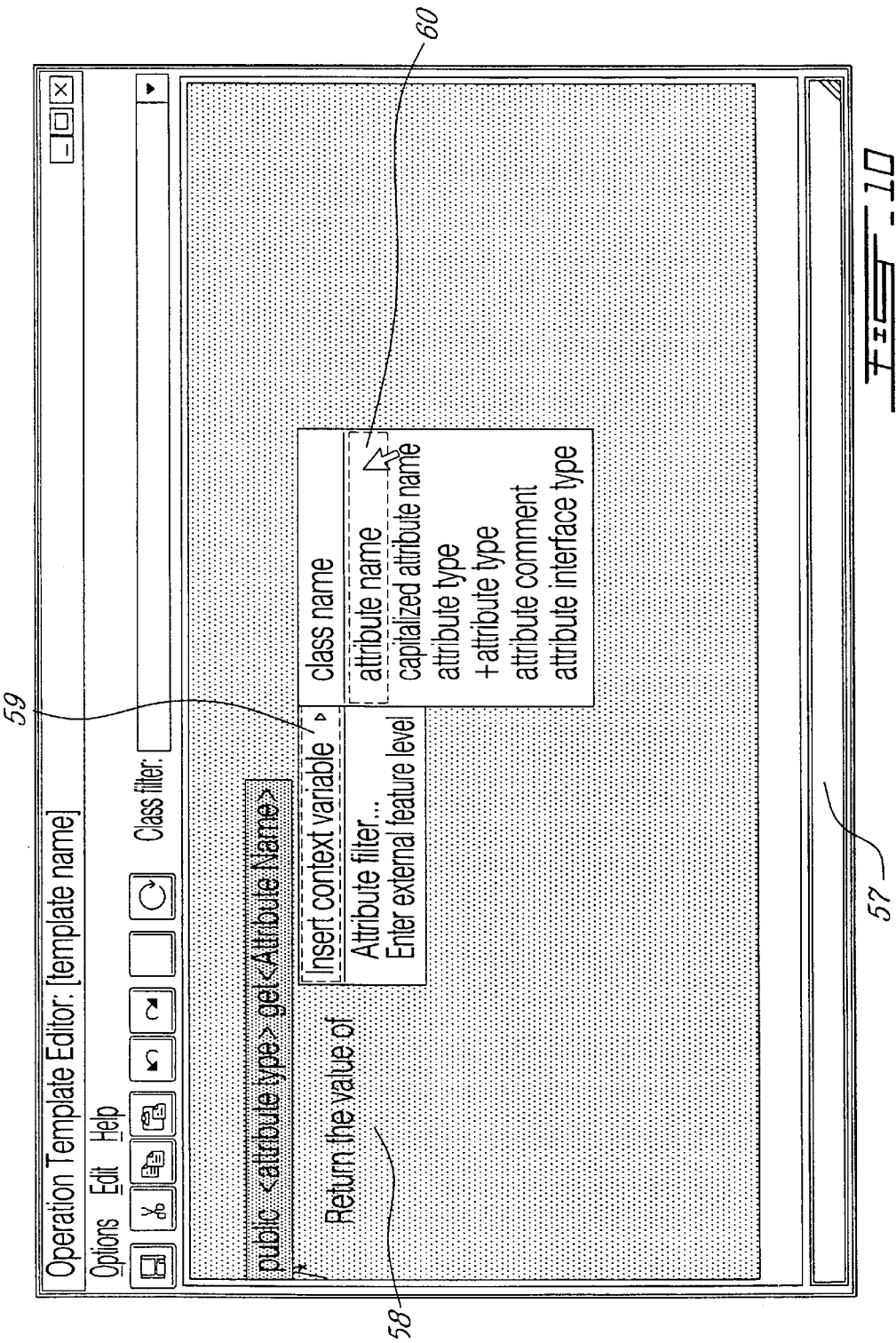

HIERARCHICALLY STRUCTURED CONTROL INFORMATION EDITOR

This application is a continuation of patent application PCT/CA00/00841 filed on Jul. 24, 2000, designating the United States and currently pending in the international stage, which claims priority under 35 USC 119(e) of U.S. provisional patent application serial No. 60/145,207 filed Jul. 23, 1999. This application is related to applicant's co-pending application entitled "Component-based source code generator" filed simultaneously herewith, the specification of which is hereby incorporated by reference.

FIELD OF THE INVENTION

The present invention is directed toward a system and method for editing source code templates in a target language utilizing a graphical user interface. More particularly, the present invention is directed to a system and method in which a programmer parameterizes target source code with contextual meta-data provided by the application domain. He determines the repetitive and nesting structures of the code which is visually clear, easy to maintain and fully consistent.

BACKGROUND OF THE INVENTION

It is commonly said that object-oriented techniques help model the real world more closely than conventional techniques and it is mostly done using modeling tools. While building a complex system, software programmers and clients can easily establish their common vocabulary, which helps them refine system requirements effectively. Object-oriented techniques also help them build a system that is easily extensible, especially when frameworks are used.

Modeling tools are used by programmers or analysts to depict the business purpose of an application in a logical way that is abstracted from the "physical implementation" of the specific programming language, operating system and the hardware that the application runs on.

One of the reasons that object-oriented programming is becoming more popular is that software reuse is becoming more important. Developing new systems is expensive, and maintaining them is even more expensive. A recent study by Wilma Osborne of the National Bureau of Standards suggests that 60 to 85 percent of the total cost of software is due to maintenance (Ware Meyers. Interview with Wilma Osborne. IEEE Software 5(3): 104–105, 1988).

Programmers traditionally use "cut and paste" techniques to facilitate the implementation of repetitive and near-repetitive methods. A kind of template is a block of target source code annotated where the change is needed, saved in a common location and reused by a programmer with some manual interventions. The programmer who created that block of target source code or another programmer can then re-use these lines by copying and pasting the appropriate lines into the code he is working on and making the appropriate changes for that particular usage. This method is error-prone and time-requiring since, in addition to copying the right lines of codes, sometimes repeatedly, the programmer has to replace all appropriate components' names by their appropriate equivalents. This is called coding with annotated source code template.

Some generation software tools allow the programmer to use textual generation templates, which consist of parameterized lines of source code, to create new operations or components. These textual generation templates enable programmers to specify the selected components for which they want to generate code by using filter variables, as well as to define the complete specifications of the operation using target source code that is parameterized by context variables. Component and attribute filter variables are used by the code generator as selection criteria to filter information from the modeling tool and to populate its dynamic generation context. Context variables refer to a component or attribute property name that the code generator replaces with the actual property value associated with the current component or attribute found in its dynamic context.

These code generators are used to deliver generation-time control and customization for integrating frameworks with components developed using today's modeling tools and programming languages. Textual generation templates are created with programmer's instructions that are given using a rigorous syntax and are used by the source code generator to replace any context variable in the provided parameterized source code. For example, a line of code could be: "persistenceSchema=new PersistenceSchema("%001"); with (&class name)", in which "%001" is a parametric symbol representing where the value of the context variable would be put by the generator, for example, the context variable "<class name>". The programmer has to create textual generation templates using these symbols. A mental list of such symbols must be built up in order for the programmer to stay consistent in naming the components, especially when there is more than one parametric symbol from %001 up to %999 that needs to be respectively associated with a context variable. A parametric symbol can appear more than once in the parameterized source code since it is always associated with the same context variable. Such symbols are not user-friendly in the sense that they do not enable the programmer to type code, as he would normally do in a non-parameterized form. In addition, these symbols have to be defined within the lines of codes to ensure proper interpretation by the generator. In the previous example, the instruction "with (&class name)" has to be added in order to instruct the generator that the parametric symbol "%1" would be replaced by the current value of the context variable associated with the current class found in the dynamic context of the generator. Also, when certain portions of the code have to be repeated more than once for attributes of a component that address the selection criteria provided by filter variables, an instruction of the kind "repeatForEach &attribute private instance using (&attribute name; &attribute attributeClassName;" would have to be included to ensure the near-repetitive operation. The code generator, in this case, will take the templates and transform then into source code using a model declaration for the system and filter variables that are defined in order to specify which templates are used for which components.

Instead of using such a syntax relying on keywords (i.e. %001) and definitions of such keywords (i.e. repeatForEach . . . using . . . or with . . . ), a programmer could decide to concatenate the parameterized code with the result of an instruction performed by an algorithm implemented in a given programming language. For example, like is taught in U.S. Pat. No. 5,675,801 to Lindsey, the software would solve the expression in parameterized form with the result of another operation. More specifically, in an example of the declaration source code template in the C language for data-oriented object known as the NumericDataItemObject and representing the C variable called "IdNumber", an instruction of the kind "int <self VarName>;" could be used, in which "int" and ";" are the source code fragment portion of this source code template and the directive for the generator is "<self VarName>". In this example, the "<" and ">" are arbitrary delineators indicating the beginning and the end of a generator directive. In this case, the object identifier is the token "self", which refers to the object being asked to generate itself, namely "IdNumber", its variable name. The message identifier is the token "varName" which will be the message sent to the object "self". This message tells the object "self" to return the string representing itself when used in a variable declaration. In this example for Lindsey, the NumericDataItemObject, whose name is "IdNumber", will return the string "idNumber". The resulting target language source code fragment is "int idNumber;", which is a C language source code fragment.

The use of colors and other display artifacts have been used in source code editors to increase the understanding of the procedural flow of an algorithm but never used to describe the structure of the information provided, such as repetitive and/or nested Context Blocks. For example, an If-then-else statement using different colors for its condition expression, its true-expression and its false-expression that have to be executed based on the result of the conditional expression. Display artifacts have never been used to illustrate the fact that the same if-then-else expression is repeated within a given component algorithm for every attribute meeting a set of selection criteria.

SUMMARY OF THE INVENTION

Accordingly, it is an object of the present invention to provide an editor that would enable programmers to create templates that are visually clear and efficient.

Another object of the present invention is to provide an editor in which repetitive and nested code is clearly identified.

Another object of the present invention is to provide an editor for creating source code templates which requires a minimum of programmer intervention to obtain the desired templates.

Yet another object of the present invention is to provide a template editor that meets the needs for editing the template source code, which can be used in all kinds of environments such as web-based servers, framework environments, code generation or else.

Another object of the present invention is to use an editor to generate script templates.

To achieve the foregoing objects in a computing environment, and in accordance with the purpose of the invention as broadly described herein, a system is provided for editing templates of component based source code. This system comprises a context editor for entering source code and, when parameterized, context variables representing the component or attribute property name that will be replaced by the generator with its actual property value at generation time. The source code is in fact captured into context blocks that can be nested among each other. They can represent a constant, conditional or repetitive context block in which case condition expressions are provided to determine if the context block is generated and how many times it will occur.

A second method provides for creating a source code template, contextually capturing control information, and representing context variables and context blocks using display effects. These effects comprise, among others, color, special fonts, modified cursor behaviors or even sound effects.

In a general aspect of the invention, two unique preferred embodiments are provided and are both related to the manipulation of hierarchically structured control information. The first process allows the efficient creation, modification and visualization of the control information for humans. The second provides a deterministic transformation of this control information into a machine-understandable format.

The first process provides a context sensitive editor to create, modify and display hierarchically structured control information. The editor presents action choices appropriate to the immediately current context, thereby simplifying the manipulation protocol of the user. Because the editor understands the relationships and multiplicity between the contexts, its graphical user interface represents the repetition and conditionality of the blocks without resorting to a scripting language. The editor displays the control information according to the presentation rules of the associated context. The presentation clearly differentiates between the bulk text, the structure in which the text resides, and parameterized elements. The editor effectively manipulates what is meta control information in a way that displays it as information.

According to a preferred embodiment of the present invention, there is provided a method and a system for displaying hierarchically structured data. The method and system comprise specifying control information concerning parametric elements of the hierarchically structured data, editing a template for the hierarchically structured data and specifying non-parametric elements of the data, specifying a context parameter as a parametric element of the data, specifying a filtering option for at least one block of the hierarchically structured data comprising at least one non-parametric element and one parametric element, associating a display characteristic with each the filtering option, displaying the hierarchically structured data identified using the display characteristic.

The second process provides a method to systematically transform the control information into a machine-understandable format.

According to another preferred embodiment of the present invention, there is provided a method for transforming hierarchically structured data into code generator script data. The method comprises specifying control information concerning parametric elements of the hierarchically structured data, editing a template for the hierarchically structured data and specifying non-parametric elements of the data, specifying a context parameter as a parametric element of the data, specifying a filtering option for at least one block of the hierarchically structured data comprising at least one non-parametric element and one parametric element, generating code generator script data using the control information, the template, the filtering option and the context parameter for a desired source code language.

BRIEF DESCRIPTION OF THE FIGURES

Having thus generally described the nature of the invention, reference will now be made to the accompanying figures, showing by way of illustration a preferred embodiment thereof, and in which FIG. 1 is a class diagram of the Hierarchically Structured Data Editor;

FIG. 2 is an example of a new template;

FIG. 3 is an example of a template translated into a scripting language;

FIG. 4 is an example of source code generated from the scripting language;

FIG. 5 is a block diagram of the display and translation system;

FIG. 6 is a flow chart of the steps that occur in a method for displaying the hierarchically structured data;

FIG. 7 is a flow chart of the steps that occur in a method for translating the hierarchically structured data into a scripting language;

FIG. 8 illustrates the new operation signature tool;

FIG. 9 illustrates the created signature within the template editor;

FIG. 10 illustrates the insertion of a context variable in a comment;

DETAILED DESCRIPTION OF THE PREFERRED EMBODIMENT

Figure 11:
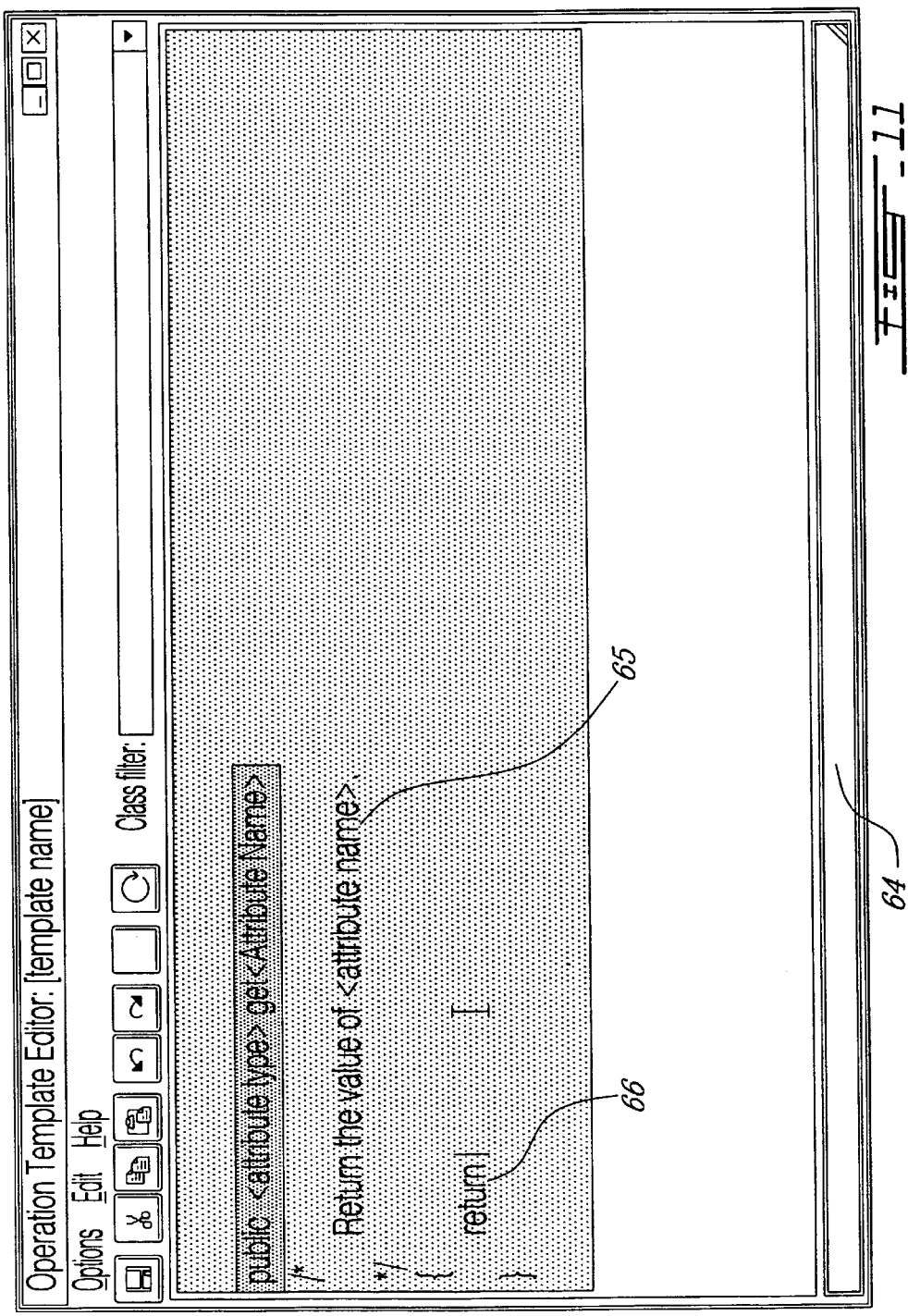
FIG. 11 illustrates the creation of an algorithm.

In order to facilitate the coding process for template programmers, a new hierarchical structured control information editor (hereafter referred to as "template editor") has been created. This template editor uses an editor to display the hierarchical structure and the parameterized code.

The main purpose of the hierarchical structured control information editor is to allow the programmer to create and edit generation templates in a form visually close to the generation output, so that it is immediately evident what output will be generated for any given input to the generator. In order to make this possible, the template editor provides a graphical context editor (see FIG. 2) where the programmer can type text (24), insert context variables (25) or insert context blocks (23). The difference between the user-entered text and the various kinds of context variables (25) or context blocks (23) is shown by various visual effects like text/background color, cursor/text behavior, and so on (see the Context Presentation Rules 31 of FIG. 1). The context variables (25) cannot be modified. They are read-only strings. The only actions possible on the context variables strings is to replace or delete them.

FIG. 1 shows a Unified Modeling Language (UML) model of the editor's implementation. The principle classes are Context Block 23, Context Variable 25, and Text String 24. The following text will describe their role in relation to both Graphical User Interface (GUI) editing and script language translating.

Text strings 24 represent static data (i.e. a set of characters) in a context block 23. Depending on the context block, the text's appearance will vary. In addition, each character has its own set of edit routines. These routines are executed when the programmer attempts to change that character. Each character of the text string 24 will also have its own set of behavioral properties. Since the character's behavioral properties tend to repeat themselves over runs of many continuous characters, a sparse representation is used in order to save computer memory.

A context variable 25 is linked to a model object by its context block 23 and can therefore represent the various characteristics of that object. In the template editor 20, each character of a Context Variable 25 has the same structure as that of a Text String 24. The template editor 20 maintains the integrity of the context variables 25 by not permitting the representation to be edited.

A context block 23 contains text strings 24, and/or context variables 25, and/or other nested context blocks 23. The role of a context block 23 is to repeatedly or conditionally produce its contents according to the conditions set upon it. For context blocks 23 that need to be repeated, the programmer has to provide the selection criteria (i.e. condition and filter variables) necessary to determine the number of repetitions. The programmer controls the sequencing of the context block 23 for each repetition through the use of criterias.

When filter or condition criteria have been provided for a context block 23, the block will not be generated unless the requirements of its criteria are filled. The context block 23 will be instantiated for every object matching the selection criteria.

Context blocks 23 have three formats: conditional (33), constant (23) and repetitive (32). A conditional context block(33) will be generated uniquely for each object that is captured by its filter (i.e. criteria). A constant context block (23) is like a conditional context block(33) having its conditions always true. Repetitive context blocks(32), however, will generate repeatedly in the object for each item captured by the context block conditions (every target role in a class, for example). Repetitive Context Blocks (32) are also capable of inserting user defined delimiter text in between each repetition of the block, such as inserting a comma followed by a space.

In the actual implementation developed in an Object Oriented language, the text (24) is composed of a String object and an Array object with the same size as the String. The Array object of the text represents the text's Behavioral Property. For each character in the String object, there is an object at the corresponding Array position which contains the information for the graphical representation of the character such as color, font size, bold or italic properties. This Behavioral Property also stores the character's type, be it Context Variable or Text String 24. These characteristics comprise the Behavioral Property, and links the text on the screen to the objects in the template editor class diagram.

The translation of the generation template entered in the template editor into a script language format is now explained. As shown in the class diagram (FIG. 1), the generation template is a sequence of Context Blocks 23. A context block contains a sequence of Text strings 24, Context Variables 25, and Context Blocks 23.

The Text String 24 represents static text which is represented as is in the script language format.

The Context Variable is placed in the script language format at the position where it is displayed graphically the value for the variable. This is shown in the script language format by a number proceed with '%' (ex:%001).The value of the Context Variable depends on the context where it is used.

When translating to a script language format, a Context Block is written in the script language format depending on a set of criteria. In the case of repetitive context blocks, the script language format is written to represent the block's repetition.

EXAMPLE

An example will now be described to better illustrate a preferred embodiment of the present invention. The example will show how to define a context hierarchy (see FIG. 1) and some presentation rules for each level of the hierarchy (see Table 1), use the control information data as defined in Table 2, define a template representing a Java method (FIG. 2), generate a template and obtaining a script (FIG. 3), execute this script using the system of published PCT patent application number WO 00/22517 entitled "Source Code Template Generator Associated with Component Development" to obtain the Java source code (FIG. 4).

The following Context Hierarchy describes the possible contexts used in Tables 2 and 3 and FIGS. 2, 3, 4. All objects used in the example belong to one of the levels of the hierarchy, and acquire the context properties associated with that level.

The following table defines each context. For each context, it also defines the possible context variables, sub-contexts, and properties available to the object. This definition allows the Template Editor (20) to display sub-menus, font and colors of the different Context Blocks (23).

TABLE 1

Presentation Rules for the hierarchy

| Level in Hierarchy | Type of entity | Display Settings | Properties |
| --- | --- | --- | --- |
| 1.1 | Class | Black on white | Name:String Attributes: {attribute} |
| 1.1.1 | Attribute | Black on Orange | Name:String Type:class |

The information (from a UML model) used to drive the instantiation of the template is shown in Table 2.

TABLE 2

Information obtained from a UML model

| Level | Name | Type of entity | Property | Value |
| --- | --- | --- | --- | --- |
| 1.1 | Cityinfo | class | class name | cityinfo |
|  |  |  | Attributes | {name country population} |
| 1.1.1 | Name | attribute | Attribute name | name |
|  |  |  | Attribute Name | Name |
|  |  |  | Attribute type | String |
| 1.1.1 | Country | attribute | Attribute name | country |
|  |  |  | Attribute Name | Country |
|  |  |  | Attribute type | String |
| 1.1.1 | Population | attribute | Attribute name | population |
|  |  |  | Attribute Name | Population |
|  |  |  | Attribute type | Integer |

A template in the hierarchical structured control information editor is shown in FIG. 2. The example is instantiated on a per-class basis.

The relation between the class diagram and the example is shown. One instance of the Generation Template corresponds to this template. This instance contains a Context Block which refers to a class Context. This Context Block contains:

TABLE 3

Contents of the Context Block

| A Text String | with the value: | /** * Take Properties result set received from database, and populate |
| --- | --- | --- |
| A Context Variable | with the value: | <class name/> (Class name) |

TABLE 3-continued

Contents of the Context Block

| A Text String | with the value: | 's Data fields. * @ param resultSet The data used in populating the |
| --- | --- | --- |
| A Context Variable | with the value: | <class name/> (Class name) |
| A Text String | with the value: | 's Data fields */ public void setPropObjectData (java.util.Properties resultSet) { |
| A Context Block | which refers to an attribute Context and contains: | if(resultSet.get("<Attribute Name/>") != null && !(resultSet.get( etc . . . |
| A Text String | with the value: | } |

FIG. 2 will be more readily understood using the following notes:

34. These blocks are instantiated on a per-class basis. All of the control information (bulk text, context variables or subordinate blocks) is instantiated once per class.

35. These are context variables. In their uninstantiated form, they appear as the name of the property within "<" and ">".

36. This block is instantiated on a per-attribute basis. Since the containing block is instantiated on a per-class basis, this block can be repeated an arbitrary number of times in each class instantiation. Effectively this number can be any number greater or equal to zero. (If there are zero attributes in the class then this block is skipped).

37. These context variables are instantiated once per attribute per class.

The scripting code of FIG. 3 is generated by passing the control data described in Table 2 into the template displayed in FIG. 2.

The template creation process occurs as follows (with reference to FIG. 2 and FIG. 3):

The instance of the Generation Template indicated the information known. This known information amounts to an introduction to the template. It provides the template name, the filter (in this case, the filter is "all classes") and the template characteristics (in this case, the template creates a Java operation):

templateName^ !setPropObjectData! definedAs^ (&class)
    generate^ (
        operation^ public^ instance^ (!setPropObjectData!)
        definedAs^ ( The scripting responsibility is then passed to the class Context Block of the template. In the script context, the Context Block is embedded in the following format:

(!<block contents>!)

Therefore, the block writes the script for its introduction:

(!

After this, the responsibility is passed to each of its children. The first child is a Text String. A Text String is generated as it appears in the script, and therefore the first Text String will write itself as:

/**
* Take Properties result set received from database, and populate
*

The next element is a Context Variable. In the script language, as explained previously, the Context Variable must write a reference to the object. In the script, the parameters are referenced according to the order of appearance of the Context Variables. This order is determined by the Context Block which registers its list of Context Variables and orders them by attributing a number to each variable.

In this case, we have the Context Variable for a Class name. The Context Variable performs a call to its Context Block to request its order of appearance.

As it is the first Context Variable, the variable obtains its order and writes:

%001

This process will repeat similarly for all the elements of the block, resulting in the following script text:

```
's Data fields.
* @param resultSet The data used in populating the
  001's Data fields
*/
public void setPropObjectData (java.util.Properties resultSet) {
```

The responsibility will be given to the Context Block, which understands that it must terminate itself with an exclamation mark (!). If the block is not repetitive and contains at least one context variable, it will write:

! with^

If it had been a Repetitive Context Block (as is the case for the attributes), it would have written:

repeatForEach^ attributeOrTargetRoleFilterExpression^ &attribute

In this case there was no filter, but if the attribute had been private, we would have written "private" after &attribute.

Next, the Context Block requests that each Context Variable to write its initialization Behavioral Property. The block therefore writes:

( and then each Context Variable takes its turn to write itself. The Class name Context Variable writes:

&class name^

As the first block has no other Context Variables, the block closes the parentheses for the parameters and then the context block closes the parentheses for itself:

))

The generation of the script continues iteratively for the additional block belonging to the current generation template until the template has fully been generated in the script language.

In FIG. 3, the bold text is derived directly from the text found in the template of FIG. 2. The underlined text is related to the context variables and the other text is structural code related to the scripting language.

The following points should be noted:

75. The main block is instantiated on a per-class basis. All the control information—bulk text, context variables or subordinate blocks are instantiated once per class.

The context variables 76 and 77 are replaced once per class

76. The position to receive the replaced context variables

77. The instructions that drive the context variable replacement

78. This block is instantiated on a per-attribute basis. Since the containing block is instantiated on a per-class basis, this block can be repeated an arbitrary number of times in each class instantiation. Effectively this number can be any number greater or equal to zero. (If there are zero attributes in the class then this block is skipped). The context variables 79 and 80 are instantiated once per attribute per class.

79. The position to receive the replaced context variables

80. The instructions that drives the context variable replacement

FIG. 4 contains the generated code in the target language. (in this case, Java). This code is only one instance of the code that could be generated from the template shown in FIG. 2. The user interface shown in FIG. 2 implicitly manages all possible instances.

The following should be noted:

81. Sections of code generated on a per class basis.

82. Context Variable <Class Name> replaced by "cityinfo"

83. Context Variables replaced by data from the instance; refer to Table 2 and FIG. 2 to see how the replacement was made.

The per attribute region

84. Context block generated from Country attribute

85. Context block generated from Population attribute

86. Context block generated from Name attribute

The preferred embodiments of the present invention will now be described using the block diagram of FIG. 5 and the flow charts of FIG. 6 and FIG. 7

FIG. 5 is a block diagram of the system for hierarchically structured data and the system for generating code generator script data. Editor 120 is used to enter and modify the template. The editor uses the context definer 121 to introduce context variables and parametric elements. In turn, the context definer 121 uses the hierarchy information definer 122 to obtain information concerning the context of the template. This context can be obtained from a UML modeling tool for example. The editor 120 also uses a filter definer 123 to define filter options for the generation of source code. The context definer 121 also communicates with the context identifier 125 to assign a display characteristic 124 to each context variable. Finally, the editor 120 sends the template to the display 126 for display. The display 126 uses the display characteristics 124 to display each parametric and non-parametric elements of the template. Optionally, the system also has a code generator script generator 127 which uses the template of the editor 120, the filter definer options 123 and the context parameters of the context definer 121 to generate code generator script data.

FIG. 6 is a flow chart of the steps that occur in a method according to a preferred embodiment of the present invention. Hierarchy information is specified 130. A template is edited 131. Context parameters are specified 132. Filtering options are also specified 133. Display characteristics are associated with context parameters 134. Finally, the data is displayed to the user 135.

FIG. 7 is a flow chart of another method according to a preferred embodiment of the present invention. Hierarchy information is specified 140. A template is edited 141. Context parameters are specified 142. Filtering options are also specified 143. Code generator script data is then generated 145 using the template, the context parameters and the filtering options.

Although the code generator script data is understood, from the preferred embodiment, to be a single file which comprises all relevant information for the code generator and which enables the code generator to produce source code in a target language, it will be understood that the code generator script data could comprise more than one data file which, when used by the code generator, enable it to produce source code in a target language. For enable, the code generator script data could comprise a first file which is context-independent and contains the methods and classes to be generated and a second file which could contain the context-dependent information such as the details on the model. The code generator script data could also only comprise context-independent data and the code generator would rely on another source to provide context-dependent information.

A specific example in which screen shots of a user interface created according to a preferred embodiment of the present invention will now be shown.

FIG. 8 shows the new operation signature tool 38. A template name 40 has to be given together with the visibility of the operation 41, the inheritance 43 and whether the operation is static 42. The return type has to be defined by its class name 44 and its package 45. The name of the operation is typed at 46. When the information is completed, the OK 39 button is pressed.

FIG. 9 shows the Template Editor 50 with the signature 52 for the operation just created. This text cannot be modified directly since it is managed by the organizer. In order to make modifications, the string of the signature can be double-clicked and the Operation Signature tool will reappear. To show that this text is created from the signature tool, it appears with a different visual aspect. In the Figures, the color of the font and the color of the background are in shades of gray since the drawings are in black and white. However, any visual characteristic could be used to enhance the difference in nature of the text appearing in the template. For example, the signature could appear with a blue background meaning that only double-clicking will allow the programmer to change what is comprised in that string. The space 53 is available for coding the operation. It is represented by a differently colored background to show that it can be filled in by the programmer. If, for example, a programmer is visually impaired, the visual effects on the screen could be replaced by sounds. In fact, as long as there is an indication that some parts of the code have different characteristics, anything could be used. A class filter 51 is specified to determine which component or components this graphical generation template will be generated for. (these steps are not shown in the figures).

Figure 12:
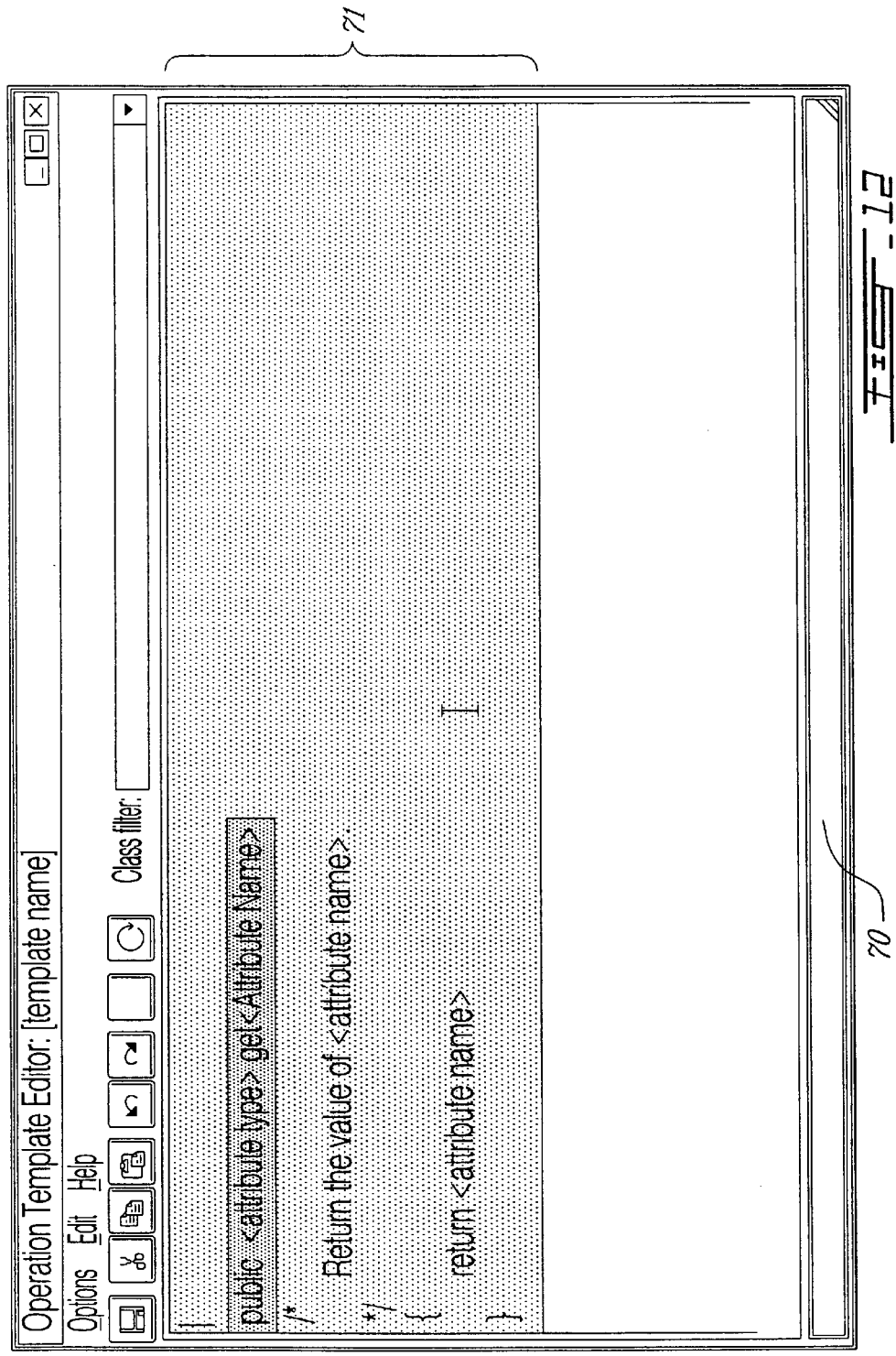
FIG. 12 illustrates the insertion of a context variable in an algorithm.

FIG. 10 shows the creation of a comment 58 within the operation. As can be seen, a context variable 59, such as the attribute name 60, can be added to the comment. FIG. 11 shows the completion of the comment 65 and some target source code as typed by the programmer. As shown in FIG. 12, by using the process described in FIG. 10, a context variable, "attribute name", was added to the code 71 of the instruction.

Figure 13:
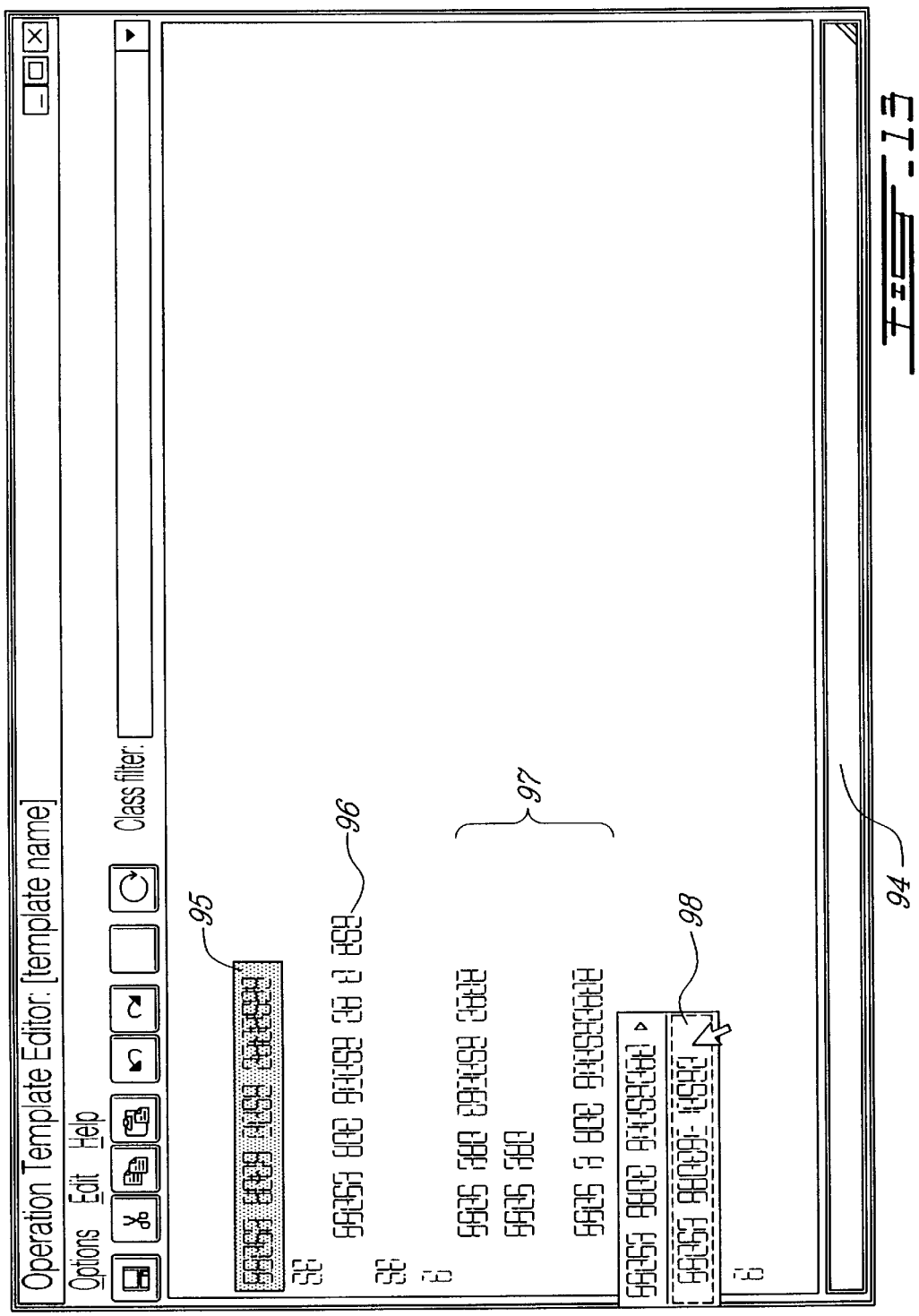
FIG. 13 illustrates how to access the attribute level.
Figure 14:
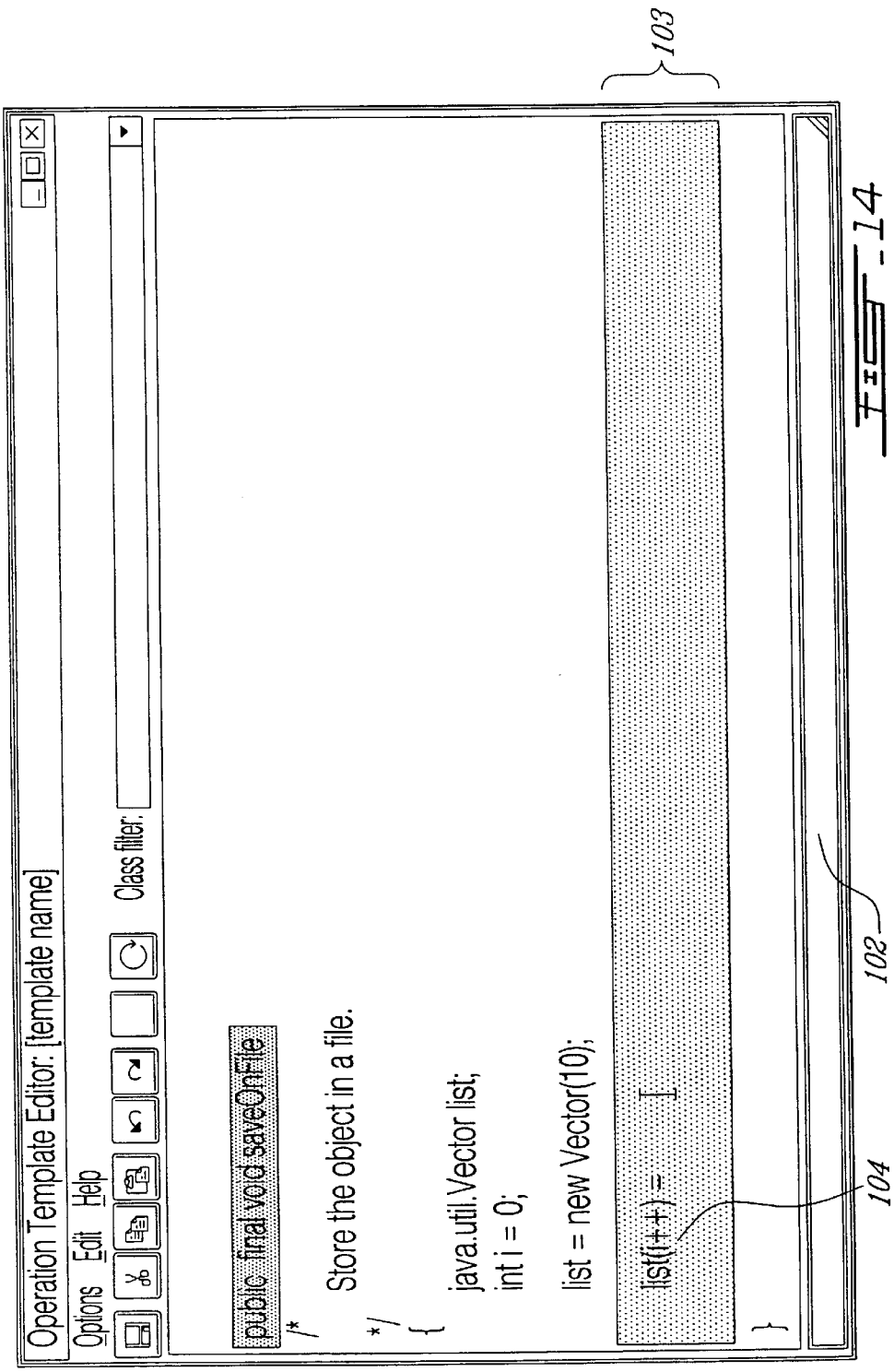
FIG. 14 illustrates how to code recursive operations for the attributes.
Figure 15:
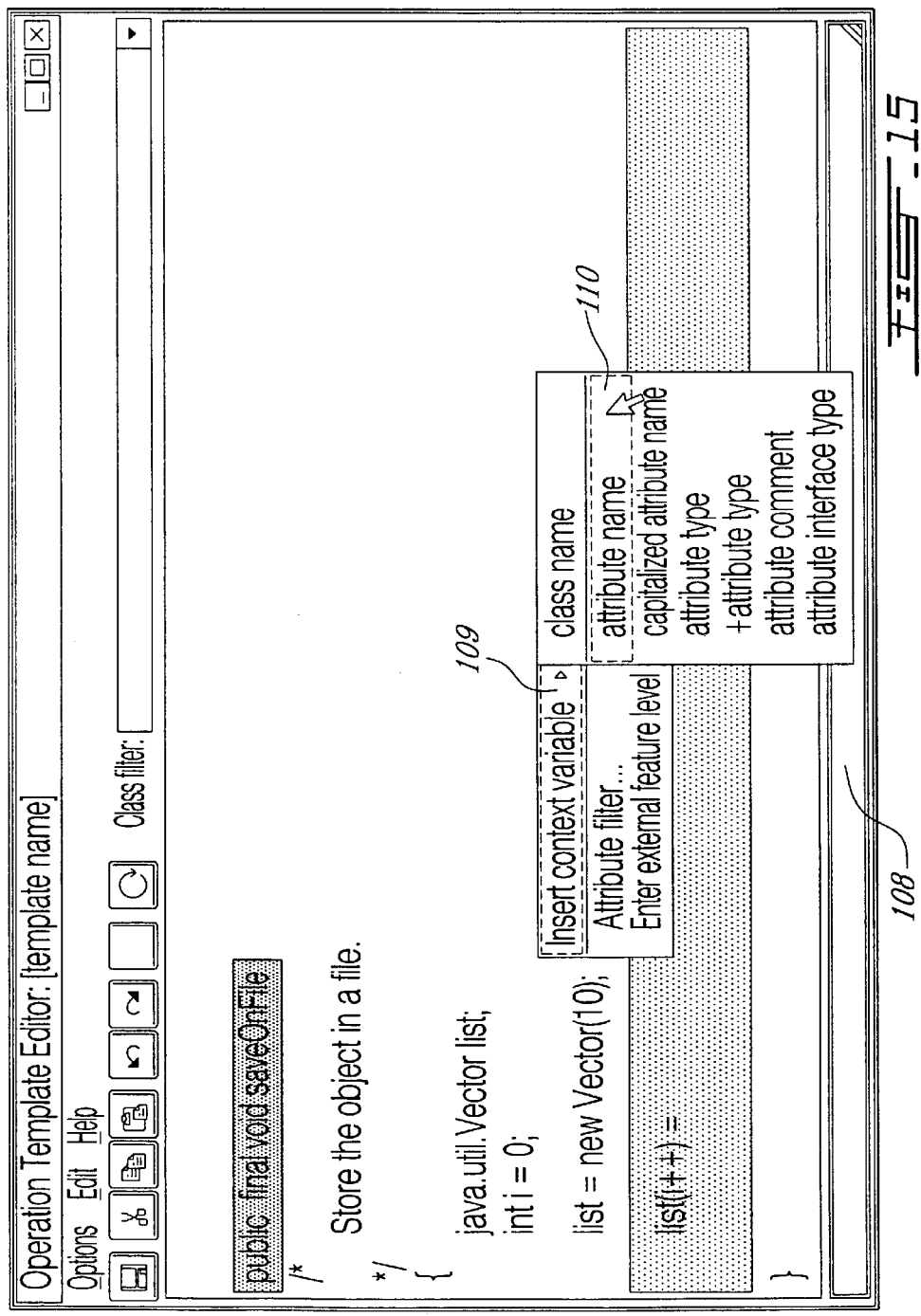
FIG. 15 illustrates how to insert a context variable at the attribute level.
Figure 16:
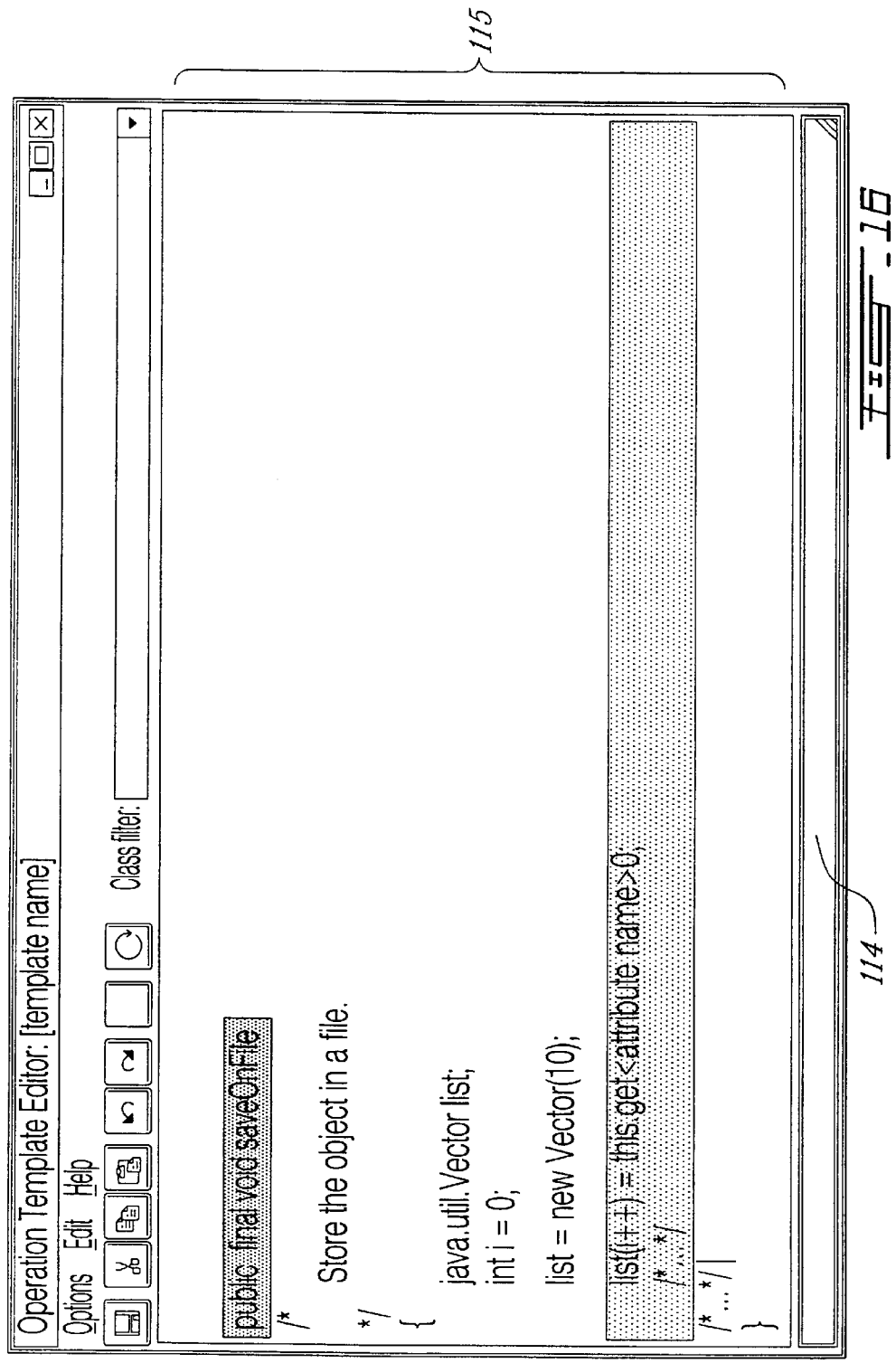
FIG. 16 illustrates a completed template.

FIG. 13 illustrates the creation of the single name operation. Again, the signature 95 is represented with a different background color. There is a comment 96 and the operation is coded at 97. If a part of the code of the operation needs to be repeated for some or all attributes of a component, it is possible to enter the attribute level 98 and create a loop. FIG. 14 shows, using a different background color 103 for the looped part of the code, a line of code 104 that will be repeated for some attributes. Again, it is possible to insert a context variable 109 at the attribute level, such as, for example the attribute name 110. Finally, a template is fully created in FIG. 16. If this template were saved, a code generator, such as the one in the previously mentioned PCT publication WO 00/22517, would use the template and a model declaration to create source code.

This invention could be used in different environments, some of which will be described herewith.

One usage of this invention would be for hiding scripting language from the developer by creating the lines of codes of a template in order to generate code with a generation tool such as the one described in the commonly assigned and co-pending PCT patent application published under number WO 00/22517 and entitled "Source Code Template Generator Associated with Component Development". In that case, the template is used to generate near-repetitive and repetitive source code for components meeting the selection criteria of the generation template and found in the modeling tool or in the integrated development environment.

When typing a context block which will be used for all classes of a system, the programmer only needs to type the method as he would like it to be when generated. Instead of writing the name of the class, he can right-mouse-click on the context editor at the point where he would like to write the class name and select from a list of all possible context variables, what he would like to appear. In this case, he would choose "<class name>". Referring to the example covered in the prior art section, the new line of code would be:

"persistenceSchema=new PersistenceSchema("<class name>");"

The context variable "<class name>" was introduced automatically by the editor once chosen in the menu appearing after the right-mouse-click.

When some context block have to be repeated more than once within the same algorithm, a loop has to be created using the filter variables which determine the selection criteria for items participating in the loop like, for example, components, components subclass, superclass, or attribute properties. In the previous example, the programmer had to define the instructions for this loop in order to cover all attributes. In the new template editor, block context that will be so closely related for all attributes are identified by a visual characteristic.

For example, the context block can be identified with a different background color. Then, the lines of code are typed in naturally, with context variables introduced by way of the right-mouse click. Since the editor knows that these lines will be reproduced for all attributes, the selection of context variables from the menu at the right-mouse-click will differ from the previous menu. These context variables will not all belong to the same categories of context variables, for example, the context variable "<class name>" will be available inside a repetitive context block that iterates at the attribute level of the current component or inside an inner context block that iterates on a given external property name associated to the current attribute of the current class found in the dynamic context of the generator. It is so because the generator will ask the outer level recursively up to the proper level to get the property value. Loops are always identified by a visual characteristic , which enhances this programming aspect. It is important to note that even when coding at the attribute level, it is possible to insert context variables that refer to the class, for example. This allows greater flexibility since the programmer can code all operations necessary at the attribute level using all context variables.

In another environment, the editor could be used for a library of lines of re-use code. For example, the templates can be used to create a personal or a networked library of available lines of code for re-use. In that case, since the templates are already parameterized, the programmer does not need to modify anything inside the lines of code in order to use them with his or her project. This approach saves a good amount of work for the programmer.

Another example of how these templates could be used is web-oriented. Until now, the HTML developers had to code web pages using pointers or tokens to the correct information. They would introduce the HTML codes that manage the presentation of the pages and include codes to access the proper information in the server's databases. Again, the template editor, inserted within his web page editing tool, would allow this programmer to create all visual aspects of the web page without worrying about the codes needed to access the data from the databases. The programmer could code the web page using traditional HTML language and add context variables reflecting the description of the information needed from the database when there is a need for generating code specific to a particular page. For example, when creating pages to give customers access to their account balance, a programmer could create one HTML template using the template editor and use a parameterized component such as <account balance> for the actual balance. When generating this code, the generator would replace the account balance with the right amount for all customers independently. The web pages would then appear to be exactly the same to the viewer except for the account balance with minimal programming on the programmer's side. The present invention would provide a graphical user interface that could be used in this environment without modifying the essence of the invention.

In the same manner, an improved version of the template editor would allow the programmer derive templates from the source code. The programmer would not need to write code with parameterized syntax. He would store his source code in a file. When realizing that this code could be reused, he could specify to the generation in which occasion this code was used, with which components, within which framework. The generator, knowing the relationships between all the components and the elements of the system then modeled, could extract information on how the code was developed. Knowing what are the names of the classes and the attributes from the model and recognizing almost-repetitive blocks of code, the editor could transform the original file into a parameterized source code for the template which could be either displayed to the programmer for approval or automatically generated and saved. The generator could then use this code and produce the generated code for the new application. The programmer would not need to write actual parameterized code.

Also, the template editor embedded in a word processor application, could be used to produce templates in order to generate text files such as parameterized mailing lists with tokens for the name, the address and the account representative for a client.

In fact, the template editor can be used to generate almost anything as long as the information on what it has to generate is available. An EXtensibe Markup Language (XML) template editor could be used. XML protocol could be used by the template editor to extract the information on what it has to generate. XML Document Type Definition (dtd) could be used to define the meta-data used by the template editor as context variable and the XML dtd tree structure definition could be used to know the different level of the parameterized source text (i.e. used to define the proper filter variable at each nested level of a XML document that is compatible.) Instead of a model declaration built using a modeling tool, a data time definition (dtd) file written in XML could be used. In that case, the XML dtd would replace the model declaration necessary for the generation of code since it describes the data to be treated. If two files are using the same dtd file, their data files can be exchanged because the organization of this data will be the same and the template editor will have the same behavior because of it.

While the invention has been described with particular reference to the illustrated embodiment, it will be understood that numerous modifications thereto will appear to those skilled in the art. Accordingly, the above description and accompanying drawings should be taken as illustrative of the invention and not in a limiting sense.

What is claimed is:

1. A system for displaying hierarchically structured data, comprising:

a hierarchy information definer for specifying hierarchy information concerning parametric elements of said hierarchically structured data;

an editor for editing a template for said hierarchically structured data and specifying non-parametric elements of said data;

a context definer for specifying a context parameter as a parametric element of said data;

a context identifier for associating a display characteristic with each said context parameter;

a filter definer for specifying a filtering option for at least one block of said hierarchically structured data comprising at least one said non-parametric element and at least one said parametric element; and a display for displaying said hierarchically structured data identified using said display characteristic.

2. A system as claimed in claim 1, wherein said display characteristic is a font format.

3. A system as claimed in claim 1, wherein said display characteristic is a background color.

4. A system as claimed in claim 1, wherein said template for hierarchically structured data comprises component-based source code.

5. A system as claimed in claim 1, wherein said at least one block of said hierarchically structured data is one of a constant, a conditional and a repetitive block of code.

6. A system as claimed in claim 1, wherein said hierarchy information definer uses hierarchy information from a Unified Modeling Language modeling application.

7. A method for displaying hierarchically structured data, comprising the steps of:

specifying hierarchy information concerning parametric elements of said hierarchically structured data;

editing a template for said hierarchically structured data and specifying non-parametric elements of said data;

specifying a context parameter as a parametric element of said data;

associating a display characteristic with each said context parameter;

specifying a filtering option for at least one block of said hierarchically structured data comprising at least one non-parametric element and one parametric element; and displaying said hierarchically structured data identified using said display characteristic.

8. A method as claimed in claim 7, wherein said editing a template for said hierarchically structured data comprises inputting code into a text pane.

9. A method as claimed in claim 7, wherein said specifying a context parameter comprises using a context parameter definer to determine parameter characteristics of said parametric element and inserting a symbolic representation of said context parameter in said data.

10. A method as claimed in claim 9, wherein using said context parameter definer comprises obtaining context sensitive information concerning said data from said hierarchy information and providing a list of context parameters available to be specified.

11. A method as claimed in claim 7, wherein said specifying hierarchy information comprising using a Unified Modeling Language modeling application to specify said hierarchy information.

12. A method as claimed in claim 7, wherein said display characteristic is a font format.

13. A method for transforming hierarchically structured data into code generator script data, comprising the steps of:

specifying hierarchy information concerning parametric elements of said hierarchically structured data;

editing a template for said hierarchically structured data and specifying non-parametric elements of said data;

specifying a context parameter as a parametric element of said data;

specifying a filtering option for at least one block of said hierarchically structured data comprising at least one non-parametric element and one parametric element;

generating code generator script data using said hierarchy information, said template, said filtering option and said context parameter for a desired source code language.

14. A method as claimed in claim 13, further comprising a step of specifying translation data comprising source code expressions associated with said elements.

15. A method as claimed in claim 13, wherein said code generator script data is used by a code generator to generate source code comprising at least one of repetitive, nested and near-repetitive source code in said desired source code language.

16. A system for transforming hierarchically structured data into code generator script data, comprising:

a hierarchy information definer for specifying hierarchy information concerning parametric elements of said hierarchically structured data;

an editor for editing a template for said hierarchically structured data and specifying non-parametric elements of said data;

a context definer for specifying a context parameter as a parametric element of said data;

a filter definer for specifying a filtering option for at least one block of said hierarchically structured data comprising at least one non-parametric element and one parametric element;

a script generator for generating code generator script data using said hierarchy information, said template, said filtering option and said context parameter for a desired source code language.

17. A system as claimed in claim 16, further comprising a translation data definer for specifying translation data comprising source code expressions associated with said elements.

18. A system as claimed in claim 16, wherein said code generator script data is used by a code generator to generate source code comprising at least one of repetitive, nested and near-repetitive source code in said desired source code language.

* * * * *